US011689423B2

(12) United States Patent
Rampalli et al.

(10) Patent No.: US 11,689,423 B2
(45) Date of Patent: Jun. 27, 2023

(54) AUTONOMOUS INTERNET SERVICE SCALING IN A NETWORK

(71) Applicant: CenturyLink Intellectual Property LLC, Broomfield, CO (US)

(72) Inventors: Pavan Sudheer Rampalli, Englewood, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/508,239

(22) Filed: Oct. 22, 2021

(65) Prior Publication Data

US 2022/0158899 A1    May 19, 2022

Related U.S. Application Data

(60) Provisional application No. 63/113,659, filed on Nov. 13, 2020.

(51) Int. Cl.
*H04L 41/0816*   (2022.01)
*H04L 41/083*    (2022.01)
*H04L 43/022*    (2022.01)
*H04L 41/0806*   (2022.01)

(52) U.S. Cl.
CPC ........ *H04L 41/083* (2013.01); *H04L 41/0806* (2013.01); *H04L 41/0816* (2013.01); *H04L 43/022* (2013.01)

(58) Field of Classification Search
CPC ............. H04L 41/0806; H04L 41/0816; H04L 41/083; H04L 41/5096; H04L 43/022; H04L 43/0811; H04L 43/20; H04L 45/125; H04L 47/522; H04L 47/6295; H04L 47/788; H04L 47/828; H04L 61/25; H04L 63/145; G06F 21/577; G06F 9/45558; H04N 21/2543; H04N 21/631
See application file for complete search history.

(56) References Cited

U.S. PATENT DOCUMENTS

2010/0332615 A1\* 12/2010 Short .................... H04L 61/25
                                                          709/225
2015/0149611 A1\* 5/2015 Lissack ............... G06F 9/45558
                                                        709/224

(Continued)

*Primary Examiner* — Le H Luu

(57) ABSTRACT

An apparatus, systems, methods, and the like, for autonomous scaling of Internet services, such as scaling Internet access speeds, provided by a communications network to one or more connected networks is provided. The service-providing network may include one or more virtual interface devices through which the connected network or device may access the Internet. The connected networks may utilize these virtual devices to communicate with the broader Internet to exchange data. For example, the connected networks may be associated with a common access point to the service providing network, such as an on-net building or other common location that utilizes the same device or devices to access the network to receive services from the network. In some implementations, the virtual network access devices may be instantiated on one or more network computing devices, such as an application server or other configurable computing and networking device.

18 Claims, 5 Drawing Sheets

(56) References Cited

U.S. PATENT DOCUMENTS

| | | | | |
|---|---|---|---|---|
| 2015/0347264 A1* | 12/2015 | Mohammed | | G06F 9/45558 |
| | | | | 714/45 |
| 2015/0347759 A1* | 12/2015 | Cabrera | | G06F 21/577 |
| | | | | 726/25 |
| 2015/0363423 A1* | 12/2015 | Utgikar | | H04L 45/125 |
| | | | | 707/827 |
| 2016/0036835 A1* | 2/2016 | Lietz | | H04L 63/145 |
| | | | | 726/22 |
| 2016/0057075 A1* | 2/2016 | Parikh | | H04L 47/828 |
| | | | | 709/226 |
| 2016/0234125 A1* | 8/2016 | Phillips | | H04N 21/2402 |
| 2016/0241446 A1* | 8/2016 | Gupte | | H04L 41/5096 |
| 2018/0014051 A1* | 1/2018 | Phillips | | H04N 21/2543 |
| 2019/0327182 A1* | 10/2019 | Parikh | | H04L 47/788 |
| 2020/0012510 A1* | 1/2020 | Andrianov | | G06F 9/45558 |
| 2020/0028749 A1* | 1/2020 | Dhandu | | H04L 43/20 |
| 2021/0014177 A1* | 1/2021 | Kasichainula | | H04L 47/6295 |
| 2022/0345974 A1* | 10/2022 | Mendiola | | H04N 21/631 |

\* cited by examiner

AUTONOMOUS INTERNET SERVICE SCALING IN A NETWORK

CROSS-REFERENCE TO RELATED APPLICATION

This application is related to and claims priority under 35 U.S.C. § 119(e) from U.S. Patent Application No. 63/113,659, filed Nov. 13, 2020 entitled "AUTONOMOUS INTERNET SERVICE SCALING IN A NETWORK," the entire contents of which is incorporated herein by reference for all purposes.

TECHNICAL FIELD

Embodiments of the present disclosure generally relate to systems and methods for implementing a communications network, and more specifically for autonomous scaling of Internet services, such as available Internet transmission speeds, provided by a communications network.

BACKGROUND

Communications networks may provide many services to customers of the network, including transmission of communications between network devices, Internet, network services, communication with network computing environments, connections to cloud services (such as storage services, networking services, compute services, etc.), and the like. To provide such services, networking components and other devices are interconnected and configured within the network such that customer devices may access the services. For example, a home or business may have a wired or wireless connection point (or points) through which communication devices, such as mobile phones and computers, may connect to the network and thereby gain access or otherwise communication with the Internet, share files, stream multimedia content, and the like. Generally, such connections have a limited transmission speed, oftentimes set at a particular number of bits of data per second. The available transmission speed for an Internet connection, for example, may be limited by many factors, including but not limited to, technical limitations of network devices associated with the Internet access, a number of customer or devices connected to the network through common devices, technical limitations of transmission lines of the network, availability of open ports of interface devices to the network, and the like. Scaling of Internet services may often require installation, often by a technician at the site, of additional network components (devices, transmission lines, software upgrades, etc.). Such a process can be time consuming and costly, require numerous actions be performed, often from multiple different groups, to prepare and configure the service (besides that of the technician), and thus includes potential points of delay to be addressed before the additional Internet service, communication speed, or other service change is available to the customer. Such complications may limit the ability of a network to scale Internet services to meet customer demands.

It is with these observations in mind, among other, that aspects of the present disclosure were conceived.

SUMMARY

One aspect of the present disclosure relates to a network management method. The method may include, in a network including a network device and providing an Internet service to a connected network, autonomously instantiating, in response to Internet service consumption by the connected network, a virtual network device on the network device, to change an available communication speed for Internet service to the connected network.

Another aspect of the present disclosure relates to an apparatus comprising a processing device and a non-transitory computer-readable medium encoded with instructions. The instructions, when executed by the processing device, cause the processing device to sample, over a period of time, communication packets from a stream of packets associated with Internet access by a plurality of connected networks and autonomously instantiate, in response to the sampled communication packets and on a computing device of a network, a virtual networking device to increase an available transmission speed for Internet access to the plurality of connected networks.

Yet another aspect of the present disclosure relates to a communications network comprising a first virtual networking device in communication with and receiving communication packets from a plurality of connected networks, the communication packets associated with Internet access by the plurality of connected networks and a computing device in communication with the first virtual networking device. The computing device may comprise a processing device and a non-transitory computer-readable medium encoded with instructions, which when executed by the processing device, cause the processing device to autonomously instantiate, in response to a sample of the communication packets received over a period of time, a second virtual networking device to increase an available transmission speed for Internet access to the plurality of connected networks.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
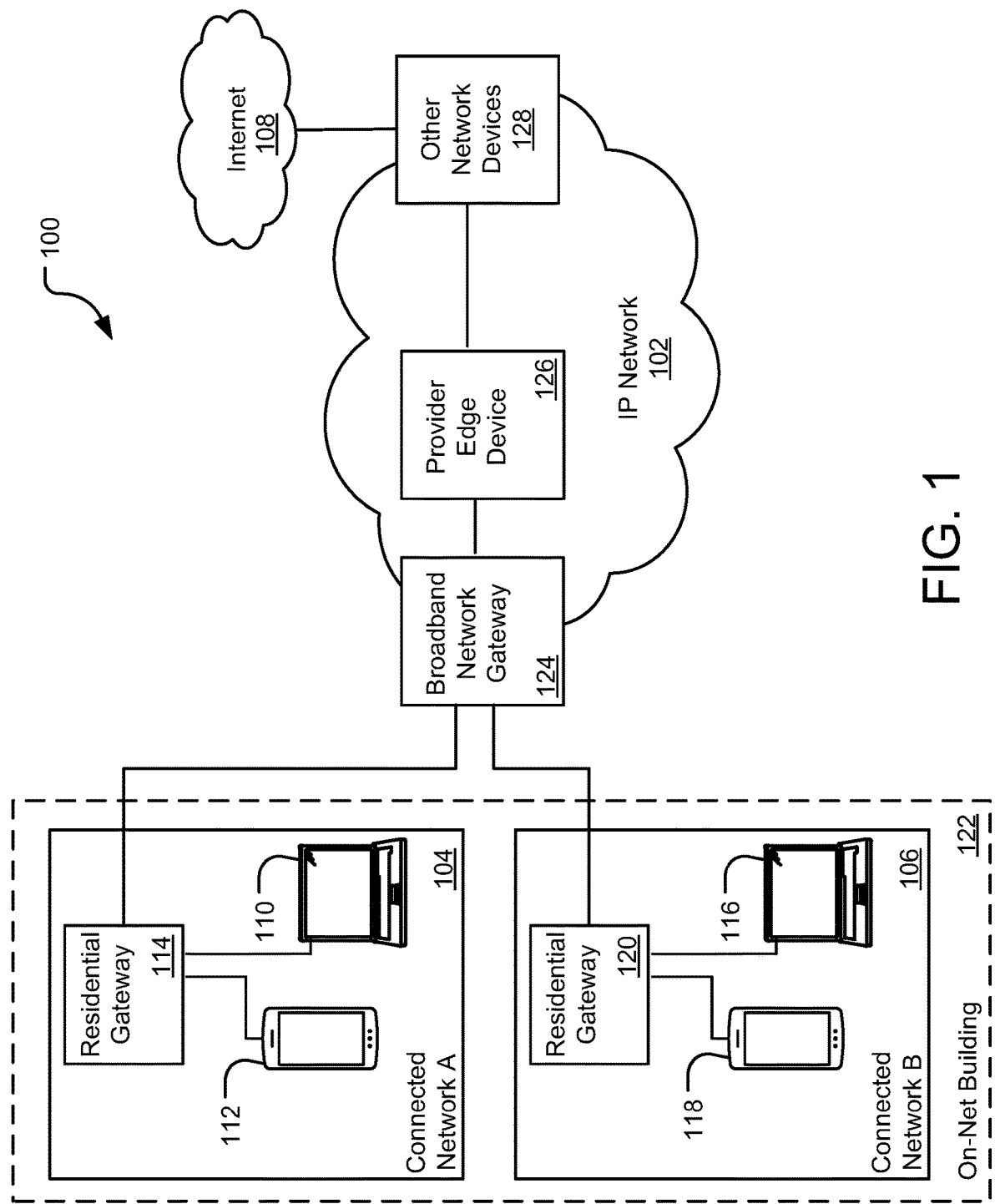
FIG. 1 schematic diagram illustrating an example of a network operating environment in accordance with one embodiment.

Aspects of the present disclosure involve an apparatus, systems, methods, and the like, for autonomous scaling of Internet services, such as scaling Internet access speeds, provided by a communications network to one or more connected networks (which may include customer networks, customer devices, or any other type of computing device). In one implementation, the service-providing network may include one or more virtual interface devices through which the connected network or device may access the Internet. Such virtual network access devices may include one or more virtual Border Network Gateway (BNGs) devices and/or one or more virtual Provider Edge (PE) devices. The connected networks may utilize these virtual devices to communicate with the broader Internet to exchange data, communications, files, multimedia presentations, etc. For example, the connected networks may be associated with a common access point to the service providing network, such as an on-net building or other common location that utilizes the same device or devices to access the network to receive services from the network. In some implementations, the virtual network access devices may be instantiated on one or more network computing devices, such as an application server or other configurable computing and networking device. The provider network may also include an Internet service platform in communication with the virtual devices to manage a number of the virtual network devices instantiated within the network to control the Internet access service provided to the connected networks.

The Internet service platform may also autonomously scale a bandwidth or availability of an Internet access service to the one or more connected networks through instantiation, decommissioning, or other management of the virtual networking devices associated with the Internet service. For example, instantiation of virtual devices in the network may provide additional Internet capacity, such as an increase in transmission speed or bandwidth, for the one or more connected networks. Similarly, removal of instantiated virtual devices from the network may reduce available Internet capacity for the one or more connected networks. In this manner, the Internet service platform may control, or scale, the available communication speeds for the connected networks through management of the virtual network devices by instantiating new virtual network devices or removing virtual network devices from the network. The Internet service platform may, in some instances, control the transmission speed for the connected networks based on inputs received from the network or network administrator or based on network operating conditions. In one implementation, the Internet service platform may obtain samples from the Internet traffic associated with the one or more connected networks and measure or derive Internet traffic information from the obtained samples. For example, the Internet service platform may determine a current or recent demand for Internet access by each or all of the connected networks from the obtained samples. Based on the current or recent demand determined from the sampled traffic, the Internet service platform of the network may scale the available transmission speed for the connected networks to provide additional transmission speed or reduce the available transmission speed by managing the virtual network devices. Through management of the virtual network devices, the Internet service platform may autonomously scale the available transmission speed in response to real-time or recent Internet traffic demands by the one or more connected networks.

The Internet service platform may also adjust the available communication speed for Internet access based on one or more traffic profiles generated for the connected networks. In particular, the Internet service platform may generate a traffic profile for the connected networks based on the sampled Internet traffic and/or other historical traffic information associated with the connected networks. The traffic profiles may include information such as usage patterns of the Internet service by a corresponding connected network, such as peak hours, maximum transmission speed usage, minimum transmission speed usage, idle usage, percentage of total available transmission speed for the on-net building used by the corresponding network, and the like. Scaling of the communication speed for the connected networks may also be based on the traffic profiles. For example, the Internet service platform may execute one or more artificial intelligence or machine learning techniques to anticipate future Internet usage by the connected networks and scale the available capacity for those networks accordingly. In one instance, a schedule of available Internet capacity for the connected networks may be generated and implemented by the Internet service platform based on the traffic profiles. In this manner, the Internet service platform may autonomously scale the available communication speed for the connected networks in response to real-time or current Internet usage conditions and/or in response to one or more traffic profiles of historical usage by the connected networks. Scaling of the available Internet transmission speed may be managed through automatic instantiation or removal of one or more network devices associated with the provided Internet access service.

Turning now to FIG. 1, an exemplary operating environment 100 for providing Internet security services for in one or more networks, including customer network A 104 and customer network B 106 via IP network 102, is shown. In general, the environment 100 provides for establishing communication sessions between network users and for providing one or more network services to network users via the communication sessions. For example, users may utilize the network 102 to communicate or otherwise interact with the broader Internet 108 via the network using communication devices, such as mobile communication devices and/or other computing devices. In some instances, content from the Internet (such as multimedia content accessible via a content delivery network (CDN)) may be provided to and/or from one or more customers of the network 102 through the operating environment 100. With specific reference to FIG. 1, the environment 100 may include an IP network 102, which may be provided by a wholesale network service provider and which may include various interconnected network devices for transmission of data packets between the devices. In some instances, the IP network 102 may be referred to as a "backbone" network that is configured to carry data packets or communications over long distances. While the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, some of which are not shown or described in detail here because those skilled in the art will readily understand these components. Communications between the IP network 102 and other entities or networks, such as one or more customer home or business local area networks (LANs) 104, 106 connected to the IP network 102, may also be managed through network environment 100. Connected networks 104, 106 may include communication devices such as, but not limited to, a personal computer 110, 116 or mobile computing device 112, 118 connected to a residential gateway 114, 120 (such as a modem) that provides an interface for the communication devices of the connected networks 104, 106. The communication and networking components of the connected networks 104, 106 enable a user at the customer network to communicate with the IP network 102 to receive services from the network 102, such as access to the Internet 108 among other network services.

Components of the connected networks 104, 106 are typically home- or business-based, but they can be relocated and may be designed for easy portability. For example, the communication device 112 may be wireless (e.g., cellular) telephone, smart phone, tablet or portable laptop computer. In some embodiments, multiple connected networks 104, 106 are owned or operated by a particular or multiple entities that may be connected to the IP network 102 from the same or similar location. For example, connected network A 104 and connected network B 106 may be located within the same building or structure (also referred to as an "on-net building"), such as an office building or apartment complex. Each network 104, 106 may be operated by a separate entity or customer to IP network 102, although each connected network accesses IP network via the same gateway device 124. The IP network 102 may provide access to the network for networks of the on-net building 122 for particular services offered by the network 102, such as Internet access. In this manner, multiple customers or connected networks 104, 106 within the same structure or in a similar location may be given access to the IP network 102 to receive available services.

Each connected network 104, 106 within the on-net building 122 may include a corresponding residential gateway 114, 120 to connect to IP network 102 through one or more interface devices 124. Although discussed herein as a broadband network gateway (BNG) 124, interface devices for the network 102 through which access to network services may be provided may include, but are not limited to, media gateway devices, provider edge devices, and/or other types of network edge devices. Further, IP network 102 may connect to other networks, such as the Internet 108, via other network edge devices, such as gateways or provider edges. For ease of instruction, only the Internet 108 is shown connecting to IP network 102; however, numerous such networks, and other devices, may be connected with the network 102, which is equipped to handle enormous numbers of simultaneous calls and/or other IP-based communications.

IP network 102 may include any number and type of network devices to provide services and transmit communication packets. In one implementation, the BNG 124 may be connected to a provider edge (PE) device 126 to receive and provide communications and other data to the connected networks 104, 106. The PE 126 may, in some implementations, provide an interface for several BNG 124 of the network 102, which in turn may provide an interface for several residential gateways (RGs) 114, 120. In this manner, the network environment 100 may include a tiered configuration, with each device providing an interface for multiple network devices a lower tier. Each component within the network 102 may be configured with particular technical capabilities to support communication traffic from lower-tiered devices. However, as explained in more detail below, such a network configuration 102 may cause bottlenecks in transmission of data or communication packets, thereby slowing traffic or limiting the capabilities of providing some services to connected networks 104, 106.

Internet services are often offered to customers or connected networks 104, 106 of the IP network 102 with a limited transmission speed or range of available transmission speeds. For example, Internet services may be offered to a residential or home network with transmission speeds starting at 100 megabytes per second (Mbps) ranging up to 1 Gigabytes per second (Gbps), at various costs depending on the transmission speed. Often, the offered transmission speed for the Internet access service is based on one or more technical limitations of components of the network 102. For example, different types of transmission lines of the network may provide different bandwidths which may limit transmission speeds to connected networks 104, 106. More particularly, a Digital Subscriber Line (DSL) may include a transmission speed limitation of 100 Mbps, a coaxial cable transmission line may provide up to 10 Gbps, and fiber optic transmission lines may provide up to 200 Gbps. Further, each network device of the IP network 102 may include its own technical limitations on the speed at which data packets may be processed and routed to other network devices, including limitations at each communication port of the respective devices. The number of devices connected to an interface device may also limit the transmission speed of an offered Internet service. For example, on-net building 122 may include several customers or connected networks 104, 106, all of which may connect to IP network 102 via the BNG 124. As more and more networks connect via BNG 124, the transmission speed limitations of BNG may be further divided among the connected networks. Any of the above may contribute to a limitation on the transmission speed available for Internet access services provided to a connected network 104, 106. Increased transmission speeds may be provided for Internet services through addition of more components (such as new transmission lines, redundant network devices for connecting networks, etc.) or upgrading components along the transmission path for the service. However, such improvements to the network may require planning for increased capacity by network engineers, manual installation of network components by a field technician, configuration and provisioning of newly installed equipment by network technicians, impacts on existing services, and high costs of new equipment and manpower, such that many network operators may resist upgrading the Internet connection service for some connected networks.

Figure 2:
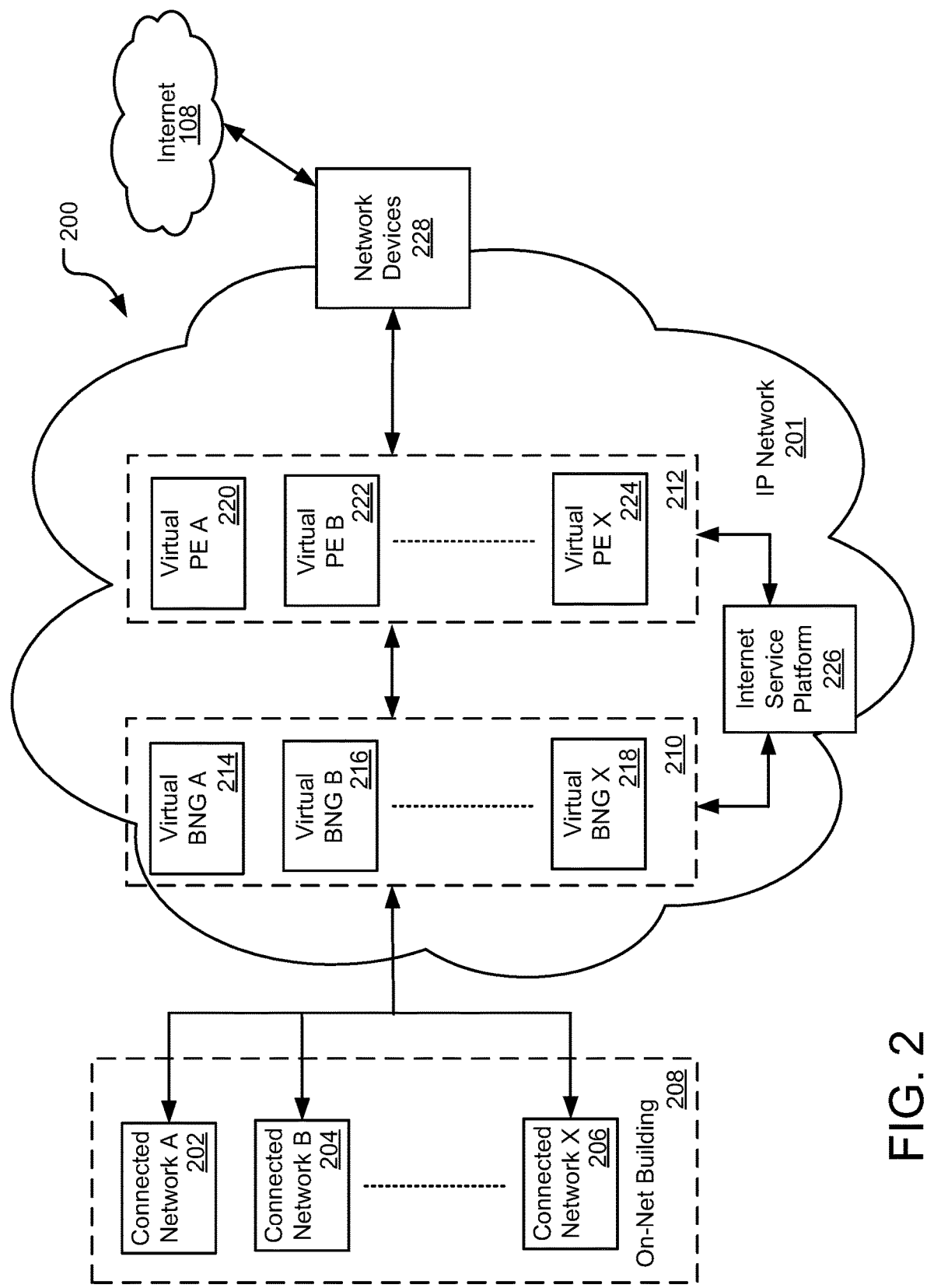
FIG. 2 is a schematic diagram illustrating a network environment for autonomous scaling of Internet services from a network in accordance with one embodiment.

To address the above-noted limitations of the network 102 providing Internet services to one or more connected networks, FIG. 2 illustrates a schematic diagram illustrating a network environment 200 for autonomous scaling of Internet services from a network in accordance with one embodiment. Some of the components of the network environment 200 may provide a similar Internet access service as discussed above and may include some similar components. For example, one or more network devices 228 may connect network 201 to Internet network 108 to provide a transmission path for one or more connected networks 202-206 for communicating with the Internet. Also similar to above, connecting network A 202 and connecting network B 204 may be located in an on-net building 208 that connects to IP network 201. As shown in the network environment 200 of FIG. 2, additional connecting networks, up to connecting network X 206, may also be located within or otherwise connect to the network 201 via on-net building 208.

In addition, IP network 201 may include a plurality of virtual BNG devices 210 and/or a plurality of virtual PE devices 212 to provide for scalability of Internet services provided to connected networks 202-206 of on-net building 208. As shown above, previous implementations of the network 201 included each connected network 104, 106 of the on-net building 122 connected through a single BNG device 124 and/or PE 126, creating a potential traffic bottleneck effect at the physical devices which may determine available transmission speeds for the connected networks 104, 106. In contrast, the network environment 200 of FIG. 2 includes one or more virtual BNGs 214-218 that may be instantiated or removed autonomously to increase or decrease the available transmission speeds for the connected networks 202-206. In one example, the virtual BNGs 210 may operate in a similar manner as a physical BNG networking device for receiving Internet traffic requests from the connected networks 202-206 and routing data or communication packets from the Internet 108 to the requesting connected network. However, instead of being a hardware-dedicated BNG device with technical limitations, the software-based virtual BNGs 210 may be scaled up or down in response to network factors, such as number of connected networks 202-206 requesting Internet service via the virtual BNGs 210. More particularly, if an increase in transmission speed for the Internet service is determined by the network 201 for the connected networks 202-206, additional virtual BNGs may be spun up or otherwise instantiated in the network 201 to increase the available transmission speeds for the connected networks 202-206. In a similar manner, if an excess of transmission speed or capacity for the Internet service is determined by the network 201 for the connected networks 202-206, one or more virtual BNGs may be decommissioned or otherwise removed from the network 201 to free up the resources used for the excess BNGs for other network uses. Thus, the network 201 may generate or instantiate a number of instantiated virtual BNGs 210 in response to network conditions such that available transmission speeds for Internet access for the connected networks 202-206 are scalable.

It should be appreciated that, although software-based virtual machines, the virtual BNGs 210 are instantiated on one or more hardware computing devices, such as application servers or other networking devices configurable to install one or more virtual machines. In some instances, the application servers may execute a cloud computing infrastructure program, such as Openstack or other types of virtual machine managers. As such, the network 201 may include hardware components sufficient to instantiate virtual BNG A 214 up through virtual BNG X 218, including installation of one or more transmission lines between on-net building 208 and the virtual BNGs 210 to carry Internet traffic between the connected networks 202-206 and the virtual BNGs 210. As explained in more detail below, distribution of the instantiated virtual BNGs 210 may be managed or otherwise controlled by an Internet Service Platform 226 of the IP network 201 and may be based at least on an analysis of Internet traffic and/or requests associated with connected networks 202-208.

The network 201 may similarly include a plurality of virtual PE devices 212 to provide additional scalability of Internet services provided to connected networks 202-206 of on-net building 208. The virtual PEs 212 may be in communication with the virtual BNGs 210 to process Internet traffic between the virtual BNGs 210 and the rest of the IP network 201. As mentioned above, a single, dedicated PE may cause a bottleneck effect for Internet access services provided to connected networks 202-206. Through the instantiation of multiple virtual PEs 212, transmission speed capacity for the Internet access service to the connected networks 202-206 may be scaled in response to network conditions, such as Internet traffic from the connected networks 202-206. Also similar to the virtual BNGs 210, the virtual PEs 212 may be instantiated or executed on one or more hardware devices of the network 201, such as one or more application servers. As such, one or more transmission lines or connections between the hardware machines of the virtual BNGs 210 and the hardware machines of the virtual PEs 212 may be included in the network 201 for transmission of Internet traffic associated with the connected networks 202-206. Other components of the network, represented in network environment 200 as network devices 228, may connect to the virtual PEs 212 to further transmit traffic to and from the Internet 108 in response to requests provided by the connected networks 202-206. In this manner, an Internet access service may be provided to the connected networks. Further, the virtual BNGs 210 and the virtual PEs 212 provide for autonomous scaling of the available transmission speed or Internet traffic capacity to the connected networks 202-206.

Figure 3:
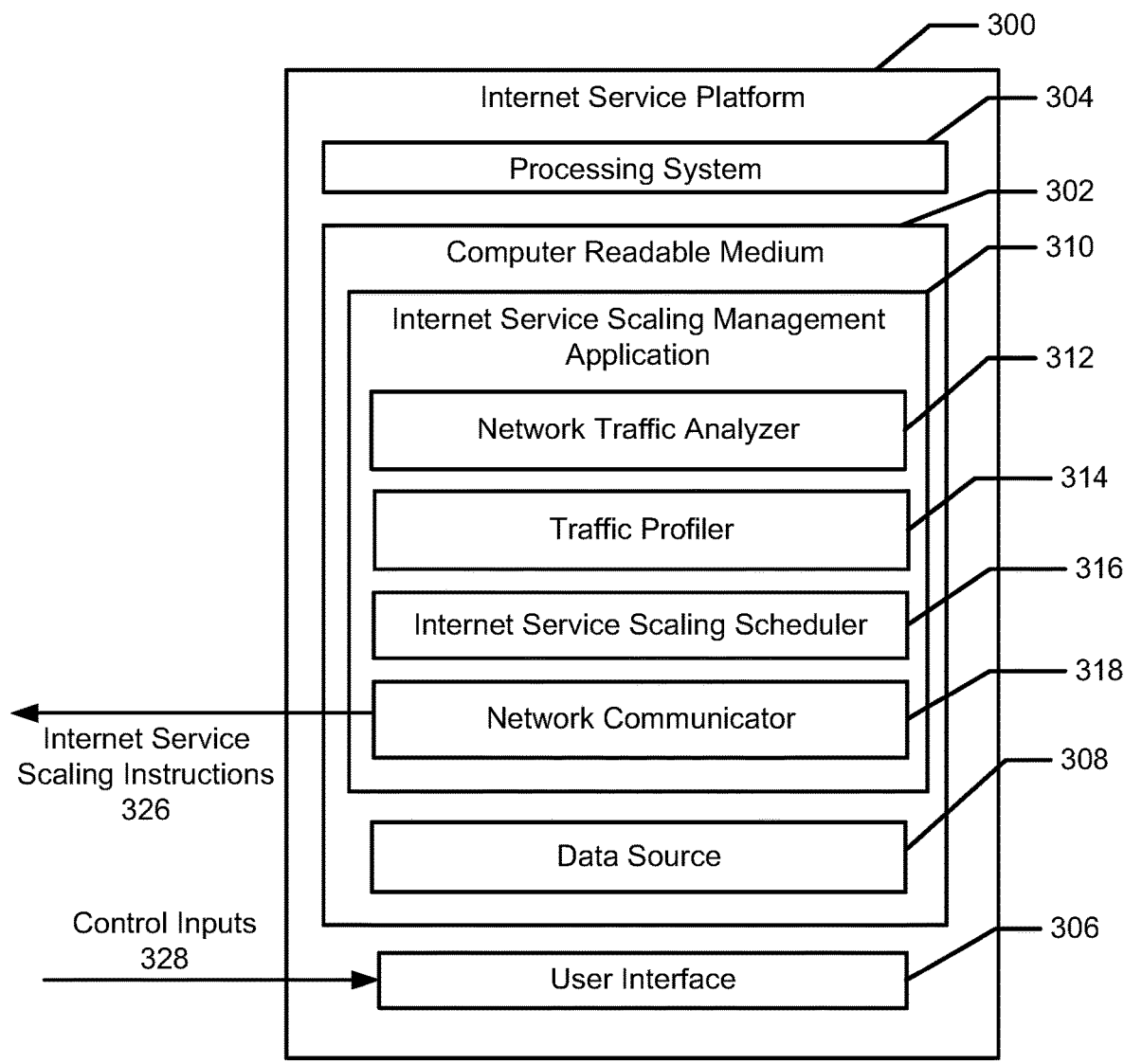
FIG. 3 is a schematic diagram illustrating an Internet service platform for autonomous scaling of Internet services from a network based on an assessment of Internet service usage in accordance with one embodiment.

As discussed above, the network 201 may include an Internet service platform 226 for managing the virtual BNGs 210 and/or the virtual PEs 212. In general, the Internet service platform 226 may be any networking or computing device or multiple networking or computing devices configured to execute an Internet service management application. One particular example of the Internet service platform is illustrated in FIG. 3. More particularly, FIG. 3 is a schematic diagram illustrating a platform 300 for autonomous scaling of Internet services from a network based on an assessment of Internet service usage in accordance with one embodiment. The platform 300 of FIG. 3 may be the Internet service platform 226 discussed above. In some instances, an Internet service scaling management application 310 may be executed on the platform 300 to perform one or more of the operations described herein. The Internet scaling management application 310 may be stored in a computer readable media 302 (e.g., memory) and executed on a processing system 304 of the platform 300 or other type of computing system, such as that described below. The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

The Internet scaling management application 310 may also utilize a data source 308 of the computer readable media 302 for storage of data and information associated with the controller system 300. For example, the Internet scaling management application 310 may store information associated with Internet access services provided by the network 201, including traffic data associated with connected networks 202-206 receiving Internet services form the network, peak times and traffic loads associated with the connected networks, service-level agreements with customers or operators of connected networks, and the like. In general, any data or information utilized by the Internet scaling management application 310 may be stored and/or retrieved via the data source 308.

The Internet scaling management application 310 may include several components to perform one or more of the operations described herein. For example, the Internet scaling management application 310 may include a network traffic analyzer 312 for sampling portions of the traffic to/from the connected networks 202-206 utilizing the virtual BNGs 210 and/or virtual PEs 212 to communicate with the Internet 108. In one particular implementation, the network traffic analyzer 312 may store a copy of transmitted packets at a preset interval, such as $10^{th}$ packet transmitted via the virtual BNGs 210, every $100^{th}$ packet, every $1000^{th}$ packet, and the like. The network traffic analyzer 312 may also extract portions from the obtained packets or otherwise derive traffic flow information from the captured packets. For example, the network traffic analyzer 312 may obtain a destination Internet Protocol (IP) address, or any other type of network address format, for the captured packet, origination network address of the sending network, port information, etc. from the header of the packet. The network traffic analyzer 312 may also classify the packet into one or more classifications based on an analysis of the extracted portion of the header or information included in a data portion of the packet. For example, the network traffic analyzer 312 may determine the captured packet is a request for streamed content (or otherwise associated with a multimedia presentation available via the network 201) and classify the packet accordingly. Other classifications may include other types of Internet traffic, including website requests, electronic mail, securing communications, and the like. The network traffic analyzer 312 may also associate the obtained packets with a particular one of the connected networks 202-206, either as originating from or intended for the corresponding connected network. The sampled packets may be obtained from one, some, or all of the virtual BNGs 210 and/or PEs 212 of the network 201. Further, some or all of the obtained packets, and/or portions of the sampled packets, may be stored in the data source 308 of the Internet service scaling management application 310 for analysis and/or classification by the traffic profiler 314.

In some implementations, one or more time stamps associated with the captured packets may also be stored. For example, some or all captured packets may be stored in the data source 308 with a time stamp associated with a time at which the packet was captured or arrived at the virtual BNGs 210 and/or PEs 212. The time stamp may include, in some instances, a date and time of day at which the packet was obtained. In general, any time information associated with the captured communication packets may be stored or otherwise noted by the network traffic analyzer 312.

The Internet scaling management application 310 may also include a traffic profiler 314 to analyze the obtained network traffic and generate one or more traffic profiles for the connected networks 202-206 utilizing the virtual BNGs 210 and/or PEs 212 of the network 201. For example, the network traffic analyzer 312 may obtain 100 communication packets over a particular period of time. Through an analysis of the packets, the traffic analyzer 312 may determine that packets associated with connected network A 202 comprise 60% of all of the obtained packets over the period of time, while packets associated with connected network B 204 comprise 10% of all obtained packets over the same period of time (with other connected networks transmitting packets via virtual BNGs 210 comprising the other 30% of the captured packets). In this manner, the traffic profiler 314 may determine how much of the available capacity for Internet communications each connected network 202-206 consumes over the period of time. In another example, the traffic profiler 314 may determine an estimated transmission speed (or number of bytes per second used by each connected network 202-206) based on a time measured between obtained packets associated with a particular connected network. More particularly, the network traffic analyzer 312 may obtain or analyze every 10 packets, 100 packets, 1000 packets, etc. As a connected networks Internet requests increase, the frequency at which packets are obtained by the traffic analyzer 312 similarly increases as the transmission speed for that connected network increases. Through an analysis of the time between obtained packets associated with a particular connected network 202-206, the traffic profiler 314 may calculate a transmission speed for Internet traffic associated with that network. Other measurements or calculations of Internet requests, data usage, transmission speeds, bandwidth, available traffic capacity consumed, and the like may be determined by the traffic profiler 314.

Based on the derived traffic information associated with the connected networks 202-206, the traffic profiler 314 may generate one or more profiles for one or more of the connected network that indicates Internet service usage for the corresponding network. For example, the traffic profiler for connected network A 202 may include daily, weekly, or monthly peak hours in which the Internet traffic associated with the network is highest or peaks. Similarly, hours at which Internet traffic is low may also be included in the traffic profile associated with the connected network 202. In one particular example, the traffic profile for connected network A 202 may indicate that Internet usage is high on Wednesday evenings from 7:00-9:00 pm and on Saturdays from 1:00-4:00, but relatively low in early morning hours. The traffic profile for connected network B 204 may indicate other peak hours, such as weekdays from 11:00 pm-Midnight and other slower hours. The variations in peak usage by the connected networks 202-296 may be based on several factors, such as the type of network (home or business), the types of Internet usages (streaming multimedia content, email or other business activities, etc.), and the like. In another instance, the traffic profiler 314 may include an indication of a percentage of available Internet traffic capacity at the on-net building 208 consumed by one or more of the connected networks 202-206 at various intervals of the day, week, month, etc. For example, the traffic profile for connected network A 202 may indicate that, over a 30-day period, connected network A utilized 80% of the total Internet packet capacity for the on-net building 208. In general, any information obtained or derived by the traffic profiler 314 and associated with a connected network 202-206 may be included in the profile for that network.

The Internet scaling management application 310 may also include an Internet service scaling scheduler 316 for adjusting available Internet transmission speeds for one or more of the connected networks 202-206 through instantiation of one or more virtual BNGs 210 and/or virtual PEs 212, sometimes based on the traffic profiles generated by the traffic profiler 314. In general, the scaling scheduler 316 may execute one or more artificial intelligence or machine learning techniques on the traffic profiles of the connected networks 202-206 and scale the available transmission speed for the networks of the on-net building 208 through control of the virtual BNGs 210 and/or virtual PEs 212. For example, the scaling scheduler 316 may determine, based on an analysis of the traffic profiles for the connected networks 202-206, that a particular capacity or transmission speed should be available for all of the connected networks from 2:00-5:00 on weekdays to prevent lagging or other slowdowns in providing the Internet services to the networks. Based on this determination, the service scheduler 316 may generate one or more instructions to instantiate additional virtual BNGs 210 and/or virtual PEs 212 in the network 201 as associated with on-net building 208. The additional BNGs 210 and PEs 212 may provide additional transmission speed for one or more of the connected networks 202-206 through an increase in processing capacity of Internet traffic through the virtual machines. After the determined peak hours, the service scheduler 316 may generate other instructions to deconstruct or remove one or more virtual BNGs 210 and/or virtual PEs 212 to free up processing capacity within the network for other uses as the demand by the connected networks 202-206 is expected to drop. The autonomous scaling of the available transmission speed for the connected networks 202-206 may therefore occur without the need of manual and physical installation of additional components in the network 201, which may sit idle during non-peak hours. By autonomously scaling based on the conditions of the network 201 and the connected networks 202-206 (both in reaction to current conditions and/or based on an analysis of historical network conditions), the IP network 201 may provide a more flexible and robust Internet access service to the connected networks. Additional examples of conditions of the network 201 and/or traffic profiles of the connected networks 202-206 that may cause scaling of the available Internet transmission speed is discussed below with reference to FIG. 4.

To scale the available transmission speed of Internet access for the connected networks 202-206, the Internet service scaling management application 310 may include a network communicator 318 to generate and transmit configuration instructions 326 to one or more devices of the IP network 102 to instantiate or otherwise manage the virtual BNGs 210 and/or virtual PEs 212. For example, the Internet service scaling scheduler 316, as described above, may generate one or more instructions to instantiate a virtual BNG 210 and/or virtual PE 212 in response to the traffic profiles of the connected networks 202-206. The network communicator 318 may receive the generated instructions from the scheduler 316 and transmit them to network devices or may translate the instructions into a format associated with a receiving network device. In some instances, the virtual BNG and/or virtual PE may be instantiated on an application server or across many network devices such that the configuration instructions 326 to scale the Internet service may be transmitted to one or more targeted devices of the network 102. Further, one or more reply messages may be received at the network communicator 318 from the targeted network devices indicated a successful or failed virtual machine instantiation. In general, the network communicator 318 may operate as an interface between the internet service scaling management application 310 and the network 201 or network devices to implement the scaling schedule for providing the Internet access service to the connected networks 202-206.

In some instances, the Internet service scaling application 310 may also provide a user interface 306 (e.g., a command line interface (CLI), a graphical user interface (GUI), etc.) displayed on a display, such as a computer monitor, for displaying data. Through the user interface 306, a user of the Internet service platform 300 may reconfigure or alter the operations of the Internet service platform, such as through one or more inputs provided through input devices. The input device for providing inputs to the Internet service platform 300 may include, among others, a keyboard or a pointing device (e.g., a mouse, trackball, pen, or touch screen) to enter data into or interact with the user interface 306.

In one example, the user interface 306 may communicate with other components in the Internet service scaling management application 310 to receive user input for manipulating or otherwise modifying the operation of the application. For example, user interface 306 may provide information for display, such as indications or information of the traffic profiles of the connected networks 202-206, proposed scaling schedule for the Internet access service, settings for network traffic analyzing, and the like. As another example, the user interface 306 may receive user input for modifying aspects of the service scaling management application 310. For example, a user of the Internet service platform 300 may provide inputs to control a sampling frequency of the network traffic analyzer 312 to increase a frequency of sampling, set a time between obtained samples, adjust time of day and associated frequency of sampling for the time of day, and the like. In another example, the control inputs 328 may adjust aspects of the Internet traffic profiles for the connected networks 202-206, such as manual inputs indicating the peak times for Internet usage for one or more connected networks 202-206 or a transmission speed requested by an administrator of one or more of the connected networks. Further still, the control inputs 328 to the user interface 306 may adjust one or more aspects of the Internet service scaling schedule for adjusting the scaling of Internet service to the connected networks 202-206. For example, the control inputs 328 may be used to manually instantiate or remove one or more virtual BNGs 210 and/or virtual PEs 212 from the network 201 to provide more or less transmission speed or capacity for Internet communications for the connected networks 202-206. In this manner, some aspects of the scaling schedule for the Internet access may be provided by a user of the Internet service platform 300, perhaps based on a traffic profile for the connected networks 202-206 or based on other aspects, such as business agreements between an administrator of the connected network and an administrator of the IP network 201. In general, any aspect of the Internet service platform 300 may be adjusted, controlled, or managed via the control inputs 328 received via the user interface 306.

It should be appreciated that the components described herein are provided only as examples, and that the Internet service scaling management application 310 may have different components, additional components, or fewer components than those described herein. For example, one or more components as described in FIG. 3 may be combined into a single component. As another example, certain components described herein may be encoded on, and executed on other computing systems.

Figure 4:
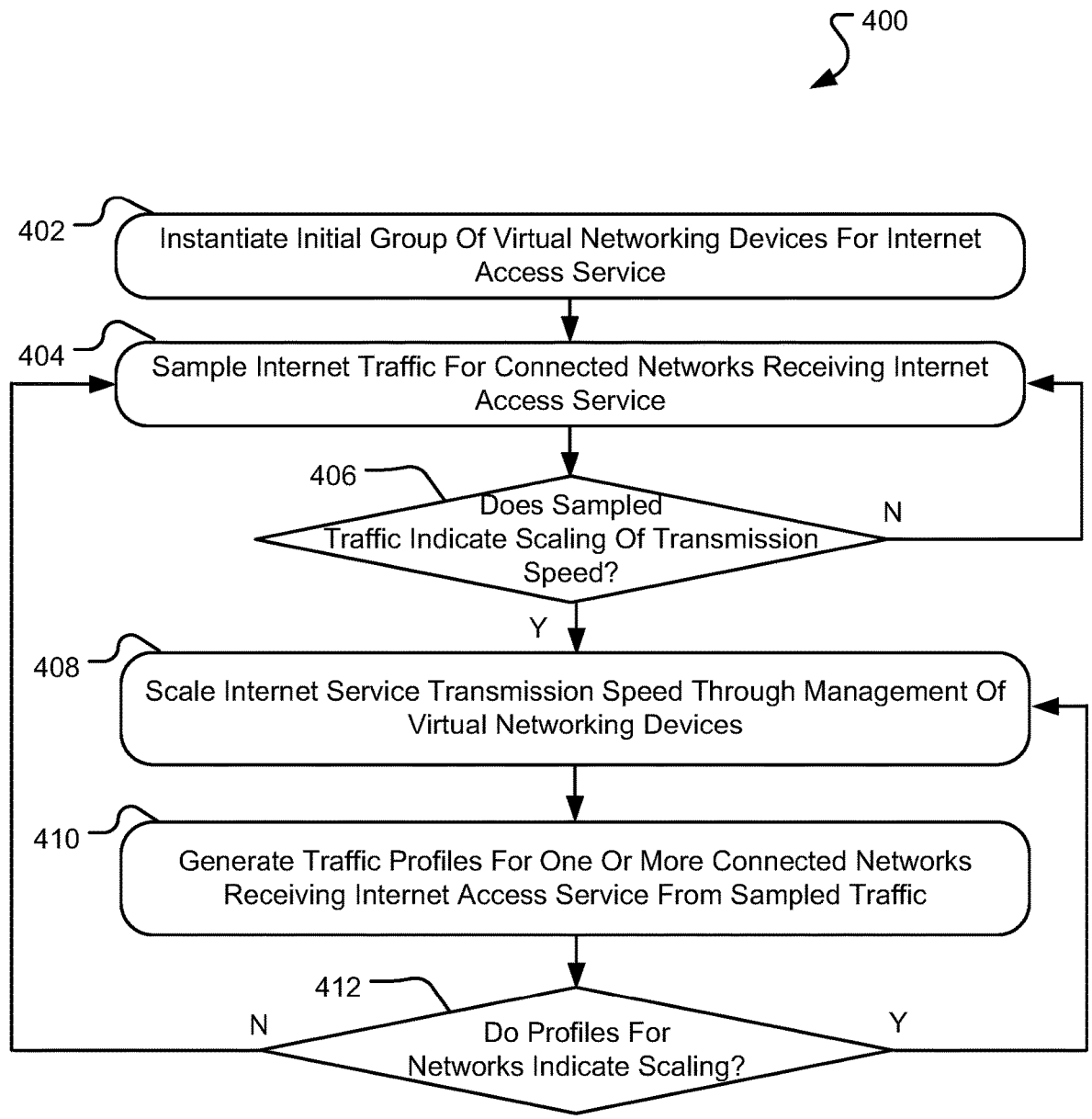
FIG. 4 is a flowchart illustrating a method for autonomously scaling an Internet access service to one or more connected networks in accordance with one embodiment.

Through the Internet service platform 300, the transmission speed for the Internet access service provided by the network 201 to the connected network 202-206 may be autonomously scaled. In particular, FIG. 4 is a flowchart illustrating a method 400 for autonomously scaling an Internet access service to one or more connected networks 202-206 in accordance with one embodiment. In one instance, the operations of the method 400 of FIG. 4 may be executed or performed by a platform, such as the Internet service platform 226 of the network 201. However, one or more of the operations may be performed by other components of the network 201. In general, the operations may be executed through hardware components, software programs, or a combination of hardware and software components.

Beginning in operation 402, the platform may instantiate an initial group of virtual networking devices within network 201 to provide an Internet access service to one or more connected network 202-206. In some instances, the connected networks 202-206 may be associated with an on-net building 208 or other common network access point or location. In general, the number of initially instantiated virtual networking devices may correspond to an available transmission speed for the connected networks. For example, one or more virtual BNG devices 210 and/or one or more virtual PE devices 212 may be instantiated in network 201 to provide each connected network 202-206 of the on-net building 208 with up to 1 Gbps transmission speed for Internet access. Through an instantiation of additional virtual devices, a higher available transmission speed may be made available to the connected networks 202-206. Conversely, removal or decommissioning of one or more virtual devices from the collection of available virtual networking devices may lower the available transmission speed for the connected networks 202-206.

To instantiate the initial virtual networking devices, the Internet service platform 226 may communicate with one or more application servers of the network 201 and cause the application servers to instantiate the virtual machines. The virtual networking devices 210, 212 may operate as interfaces between the connected networks 202-206 and the network 201 from which Internet access is provided. In one instance, the number of initial virtual networking devices 210, 212 may be based on current or historical network conditions, current or historical operation or interactions with the connected networks 202-206, one or more service agreements between administrators of the connected networks and the IP network 201, one or more network policies, and the like.

Upon instantiation of the virtual network devices 210, 212, connected networks 202-206 may access the Internet 108 via network 201. In particular, the virtual network devices 210, 212 provide an interface for the connected networks 202-206 to access the Internet 108 such that a number of instantiated virtual devices may determine an available transmission speed or capacity for the connected networks to request and receive content or data from the Internet 108. As such, communication packets or other data associated with accessing the Internet 108, such as requests to access websites, stream content, receive email, etc., may be transmitted through the instantiated virtual devices 210, 212. In operation 404, the Internet service platform 226 of the network 201 may sample portions of the Internet traffic originating from or intended for connected networks 202-206. As discussed above, the sampling rate of the Internet traffic associated with the connected networks 202-206 may be based on a time period and/or a number of communication packets. Information from each of the sampled packets may be extracted or derived by the platform 226 to obtain an indication of a usage of the available capacity of the virtual networking devices by each of the connected networks 202-206. For example, the sampled packets may indicate that network A 202 is using 1 Gbps of the available capacity or transmission speed over the period of time in which the packets are sampled. Usage of the virtual network devices 210, 212 of the other connected networks may also be determined through an analysis of the sampled packets, as explained above. In general, the sampled packets provide an indication of a usage of the Internet access service used by each of the connected networks 202-206 over the sampled time period.

In operation 406, the platform 226 may determine if the information obtained from the sampled data packets indicate an adjustment or scaling of the available transmission speed for one or more of the connected networks 202-206 of the on-net building 208. In one instance, the platform 226 may compare the information obtained from the sampled packets (such as a transmission speed or capacity consumed used by a network) to one or more threshold values. For example, the platform 226 may determine that connected network A 202 exceeded an upper threshold transmission speed value for a time period based on the sampled packets from the Internet traffic. Exceeding an upper threshold may indicate that an available transmission speed for accessing the Internet 108 should be increased to meet the higher demand of the connected networks 202-206. Similarly, the obtained information from the sampled packets may exceed a lower threshold value that may indicate the number of virtual network devices providing the Internet service to the connected networks 202-206 may be too high and the networks may receive the same level of Internet access with fewer instantiated virtual devices. Further, other information obtained from the sampled data packets may indicate scaling of the virtual network devices 210, 212 associated with the Internet service to the connected networks 202-206, such as percentage of total capacity consumed by one or more of the networks, trends in capacity usage of one or more of the networks (such as an increase in usage over a period of time or a decrease in usage over the period of time), service agreements for the connected networks, and the like. In general, any aspect of the sampled Internet packets may be considered when determining a scaling of the available transmission speed for the connected networks 202-206. Further, the threshold values utilized in making such determinations may be preset by the platform or may be calculated from the information obtained from the sampled communication packets.

If the information obtained from the sampled packets does not indicate scaling of the available transmission speed is triggered (based on a comparison to one or more threshold values), the platform may continue to sample or otherwise monitor the Internet traffic usage by the connected networks 202-206 in operation 404. However, if scaling of the Internet service transmission speed is triggered, the platform 226 may adjust the available transmission speed for Internet access accordingly. For example, the platform 226 may transmit one or more instructions to devices of the network 201 to instantiate a virtual BNG and/or virtual PE to provide additional transmission speed Internet access to one or more of the connected networks 202-206. The platform 226 may also remove or decommission one or more virtual BNGs and/or virtual PEs to reduce an available transmission speed for the connected networks to conserve network resources and/or redirect the network devices for other tasks. In this manner, the total available transmission speed for Internet access for the connected networks 202-206 may be scaled in response to the sampled Internet traffic data such that real-time, autonomous scaling of the service occurs for the connected networks.

In operation 410, the platform 226 may generate one or more traffic profiles for one or more of the connected networks 202-206 of the on-net building 208 that receive the Internet access service from the network 201. As explained above, the traffic profiles associated with the connected networks 202-206 may include information on usage patterns of the Internet service by the corresponding connected network, such as peak hours, maximum transmission speed usage, minimum transmission speed usage, idle usage, percentage of total available transmission speed for the on-net building used by the corresponding network, and the like. In some instances, the traffic profiles for the connected networks 202-206 may be generated from the sampled Internet traffic obtained or derived from the Internet service platform 226. For example, the sampled traffic may indicate a transmission speed or capacity used by connected network A 202 during a particular time period. The capacity used by network A 202 may be included in a traffic profile for that particular network, including noting the time period for which the determined transmission speed is obtained. Through sampling of the Internet traffic from connected networks 202-206 of the on-net building 208 over time, traffic profiles from the connected networks may be generated. In addition, traffic profiles for the connected networks 202-206 may be adjusted, amended, or altered in response to additional information obtained from sampled traffic data. In this manner, the traffic profiles for the connected networks 202-206 may be generated or altered for use by the service platform 226.

In operation 412, the platform 226 may determine if additional scaling of the available transmission speed for Internet service to the connected networks 202-206 is needed based on an analysis of the traffic profiles associated with the connected networks. For example, the traffic profiles may indicate that connected network A 202 is nearing or in a peak hour in which Internet traffic requests by network A is high. In response, the platform 226 may scale the available transmission speed for connected network A 202 in anticipation of more Internet requests from network A. Similarly, although current Internet service traffic may high from the connected networks 202-206, the traffic profiles for all of the connected networks may indicate that a period of time with relatively lower Internet requests is nearing. In response, the platform 226 may schedule or begin removing virtual BNGs 210 or virtual PEs 212 from the network 201 and, in some instances, reconfigure the resources of the decommissioned virtual machines to other network purposes. In another example, the platform 226 may generate a daily, weekly, or monthly schedule for scaling of the available transmission speed for Internet service for the connected networks 202-206, which may provide a baseline available transmission speed. Adjustments to the baseline available transmission speed in real-time through an analysis of sampled Internet traffic, as described above. In this manner, the initial instantiated group of virtual devices to provide the Internet service may be based on one or more traffic profiles of the connected networks 202-206.

If the platform 226 determines, based on the traffic profiles of the connected networks 202-206, to scale the available transmission speed to the on-net building 208, the platform may return to operation 408 and instantiate additional virtual BNGs 210 and/or virtual PEs 212 or remove or decommission deployed virtual devices. If the platform 226 determines, based on the traffic profiles of the connected networks 202-206, that the current available transmission speed is sufficient to process the Internet requests, the platform 226 may return to operation 404 to continue sampling the Internet traffic from the on-net building 208. Thus, through the operations of the method 400, the Internet service platform 226 may scale the available transmission speed for the connected networks 202-206 in response to real-time or current Internet usage conditions and/or in response to one or more traffic profiles of historical usage by the connected networks. Scaling of the transmission speed for the connected networks 202-206 based on the traffic profiles may be determined through execution of one or more artificial intelligence or machine learning techniques to anticipate future Internet usage by the connected networks and scale the available capacity accordingly.

Figure 5:
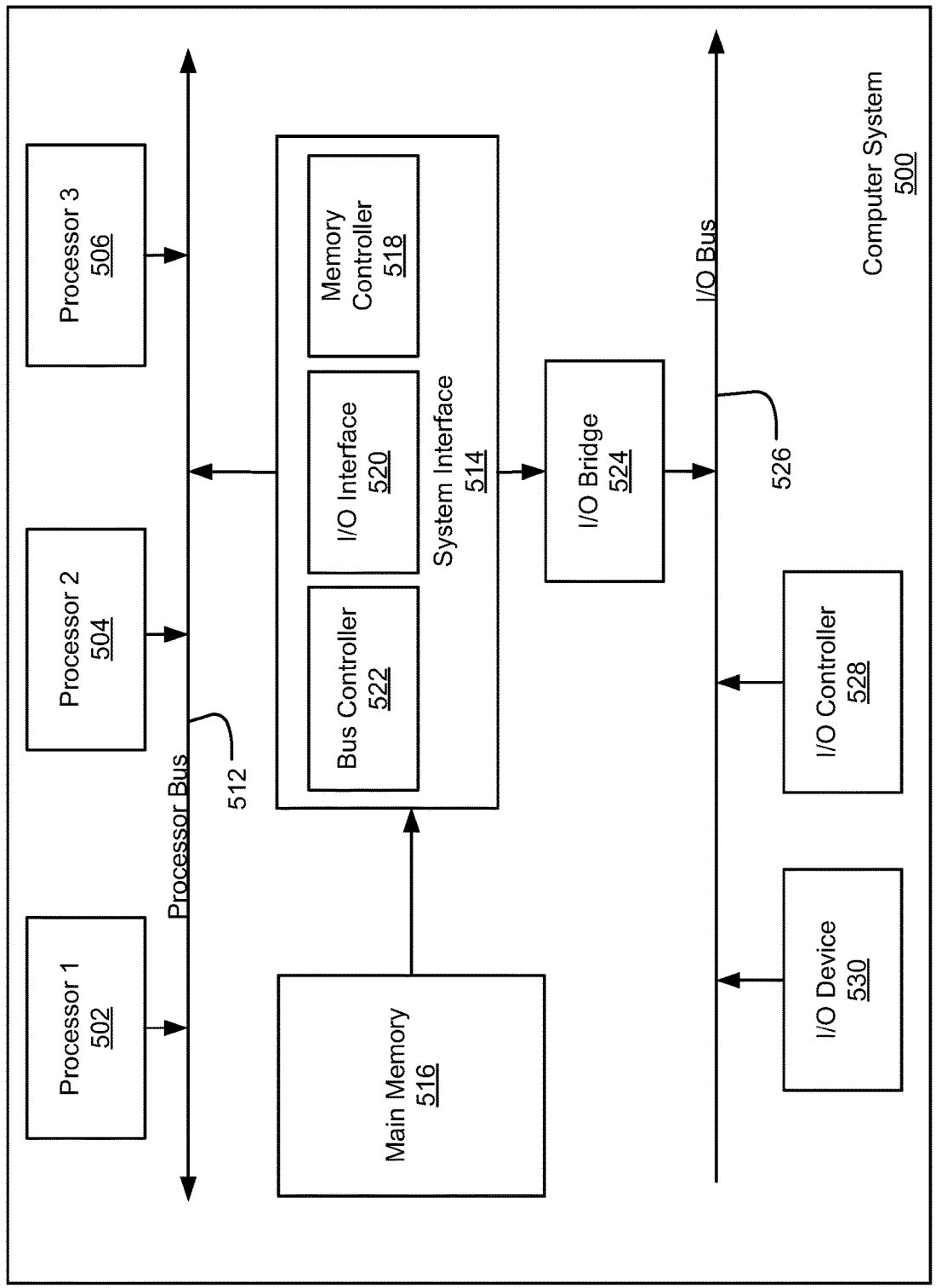
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the Internet service platform 226 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Various modifications and additions can be made to the exemplary embodiments discussed without departing from the scope of the description. For example, while the embodiments described above refer to particular features, the scope of this invention also includes embodiments having different combinations of features and embodiments that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

We claim:

1. A network management method comprising:
in a network including a network device and providing an Internet service to a connected network, autonomously instantiating, in response to Internet service consumption by the connected network, a virtual network device on the network device, to change an available communication speed for Internet service to the connected network; and
autonomously decommissioning, in response to a second network operating condition and from the device of the network, a virtual network device to decrease the available transmission speed for Internet access to the connected network.

2. The method of claim 1 wherein the connected network is one of a plurality of connected networks accessing the network via a shared access point to the network.

3. The method of claim 2, further comprising:
sampling, over a period of time, one or more communication packets from a stream of packets associated with Internet access by the plurality of connected networks.

4. The method of claim 3 wherein the sampling of the one or more communication packets occurs at a rate of every X number packets of the stream of packets, with X being an integer value greater than one.

5. The method of claim 3 wherein the Internet service consumption by the connected network is based on the sampling of the one or more communication packets.

6. The method of claim 3, further comprising:
generating, based on the sampling of the one or more communication packets, an Internet traffic profile associated with the connected network, the Internet traffic profile comprising a time period and an average consumption of the Internet service during the time period.

7. The method of claim 6 wherein the network operating condition comprises the Internet traffic profile associated with the connected network and autonomously instantiating the virtual network device is further based on the traffic profile.

8. The method of claim 1 wherein the virtual network device is one of a virtual Border Network Gateway networking device or a virtual Provider Edge networking device.

9. An apparatus comprising:
a processing device; and
a non-transitory computer-readable medium encoded with instructions, which when executed by the processing device, cause the processing device to:
sample, over a period of time, communication packets from a stream of packets associated with Internet access by a plurality of connected networks;
autonomously instantiate, in response to the sampled communication packets and on a computing device of a network, a virtual networking device to increase an available transmission speed for Internet access to the plurality of connected networks; and
autonomously decommission, in response to a network operating condition, a second virtual network device to decrease the available transmission speed for Internet access to the plurality of connected networks.

10. The apparatus of claim 9 wherein the plurality of connected networks access the network via a shared access transmission line to the network.

11. The apparatus of claim 9 wherein the virtual networking device is one of a border network gateway device configured to provide access to the network for a plurality of access networks or a provider edge device configured to provide a network service to a plurality of border network gateway devices.

12. The apparatus of claim 9 wherein the sampling of the communication packets occurs at a rate of every X number packets of the stream of packets, with X being an integer value greater than one.

13. The apparatus of claim 9 wherein the instructions, when executed by the processing device, further cause the processing device to:
determine an Internet consumption by at least one of the plurality of connected networks based on the sampling of the communication packets.

14. The apparatus of claim 9 wherein the instructions, when executed by the processing device, further cause the processing device to:
obtain a connected network identifier from at least a portion of the sampled communication packets; and
generate, based on the obtained connected network identifier, an Internet traffic profile associated with a network of the plurality of connection networks, the Internet traffic profile comprising a time period and an average consumption of the Internet service during the time period by devices of the network of the plurality of connection networks.

15. The apparatus of claim 14 wherein autonomously instantiating the virtual network device is further based on the traffic profile of the network of the plurality of connection networks.

16. A communications network comprising:
a first virtual networking device in communication with and receiving communication packets from a plurality of connected networks, the communication packets associated with Internet access by the plurality of connected networks; and
a computing device in communication with the first virtual networking device, the computing device comprising:
a processing device; and
a non-transitory computer-readable medium encoded with instructions, which when executed by the processing device, cause the processing device to:
autonomously instantiate, in response to a sample of the communication packets received over a period of time, a second virtual networking device to increase an available transmission speed for Internet access to the plurality of connected networks; and
autonomously decommission, in response to a network operating condition, a second virtual network device to decrease the available transmission speed for Internet access to the plurality of connected networks.

17. The communications network of claim 16 wherein the instructions, when executed by the processing device, further cause the processing device of the computing device to:
obtain a connected network identifier from at least a portion of the sample of the communication packets; and
generate, based on the obtained connected network identifier, an Internet traffic profile associated with a network of the plurality of connection networks, the Internet traffic profile comprising a time period and an average consumption of the Internet service during the time period by devices of the network of the plurality of connection networks.

18. The communications network of claim 17 wherein autonomously instantiating the second virtual network device is further based on the traffic profile of the network of the plurality of connection networks.

* * * * *